US009133375B2

(12) United States Patent
Sturgill et al.

(10) Patent No.: US 9,133,375 B2
(45) Date of Patent: Sep. 15, 2015

(54) EPOXY-PASTE ADHESIVES RESISTANT TO WASH-OFF

(75) Inventors: David Sturgill, Brookfield, WI (US); Scott L. Hartsell, Troy, MI (US); Jeng-Li Liang, Auburn Hills, MI (US); Rajat K. Agarwal, Brighton, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 70 days.

(21) Appl. No.: 12/770,342

(22) Filed: Apr. 29, 2010

(65) Prior Publication Data
US 2010/0272908 A1 Oct. 28, 2010

Related U.S. Application Data

(63) Continuation of application No. PCT/US2008/012264, filed on Oct. 29, 2008.

(60) Provisional application No. 60/983,748, filed on Oct. 30, 2007.

(51) Int. Cl.
 C08K 3/36 (2006.01)
 C08L 63/00 (2006.01)
 C08L 63/02 (2006.01)
 C08L 63/04 (2006.01)
 C09J 163/00 (2006.01)
 C08K 5/00 (2006.01)
 C08L 33/20 (2006.01)

(52) U.S. Cl.
 CPC ............. C09J 163/00 (2013.01); *C08K 5/0008* (2013.01); *C08L 33/20* (2013.01)

(58) Field of Classification Search
 None
 See application file for complete search history.

(56) References Cited

U.S. PATENT DOCUMENTS

| 2,739,075 | A | | 3/1956 | Iler |
| 2,786,042 | A | | 3/1957 | Iler |
| 3,525,779 | A | | 8/1970 | Hawkins |
| 3,636,133 | A | | 1/1972 | Hawkins |
| 4,340,716 | A | | 7/1982 | Hata et al. |
| 4,395,503 | A | * | 7/1983 | McClung ...................... 523/440 |
| 4,465,542 | A | | 8/1984 | Furihata |
| 4,585,698 | A | * | 4/1986 | Anzai et al. ................... 428/413 |
| 4,702,962 | A | | 10/1987 | Kojo |
| 5,006,611 | A | | 4/1991 | Schmid et al. |
| 5,073,601 | A | | 12/1991 | Muelhaupt et al. |
| 5,084,532 | A | | 1/1992 | Schenkel |
| 5,198,286 | A | | 3/1993 | Kagoshima et al. |
| 5,202,390 | A | | 4/1993 | Muelhaupt et al. |
| 5,218,063 | A | | 6/1993 | Kimball |
| 5,278,257 | A | | 1/1994 | Muelhaupt et al. |
| 5,290,851 | A | * | 3/1994 | Ishida et al. ................... 524/731 |
| 5,290,857 | A | | 3/1994 | Ashida et al. |
| 5,637,179 | A | | 6/1997 | Nakayama et al. |
| 5,677,387 | A | | 10/1997 | Bayard et al. |
| 5,686,509 | A | | 11/1997 | Nakayama et al. |
| 5,686,534 | A | | 11/1997 | Bayard et al. |
| 5,789,482 | A | | 8/1998 | Eldin et al. |
| 5,859,155 | A | * | 1/1999 | Furihata et al. ............... 525/531 |
| 5,886,112 | A | | 3/1999 | Vuillemin et al. |
| 6,015,865 | A | * | 1/2000 | Blank et al. .................... 525/524 |
| 6,037,392 | A | | 3/2000 | Tang et al. |
| 6,045,898 | A | * | 4/2000 | Kishi et al. .................. 428/292.1 |
| 6,060,540 | A | | 5/2000 | Wanthal et al. |
| 6,111,015 | A | | 8/2000 | Eldin et al. |
| 6,180,693 | B1 | | 1/2001 | Tang et al. |
| 6,573,309 | B1 | | 6/2003 | Reitenbauch et al. |
| 6,776,869 | B1 | | 8/2004 | Schenkel |
| 6,884,854 | B2 | | 4/2005 | Schoenfeld et al. |
| 6,894,113 | B2 | | 5/2005 | Court et al. |
| 6,949,602 | B2 | | 9/2005 | Gosiewski et al. |
| 6,998,011 | B2 | | 2/2006 | Schoenfeld et al. |
| 2003/0125423 | A1 | | 7/2003 | George et al. |
| 2003/0187154 | A1 | | 10/2003 | Schoenfeld et al. |
| 2003/0196753 | A1 | | 10/2003 | Schoenfeld et al. |
| 2004/0039084 | A1 | | 2/2004 | Beisele |
| 2004/0181013 | A1 | | 9/2004 | Schenkel |
| 2004/0266899 | A1 | | 12/2004 | Muenz et al. |
| 2005/0022929 | A1 | | 2/2005 | Schoenfeld et al. |
| 2005/0070634 | A1 | | 3/2005 | Lutz et al. |
| 2005/0103422 | A1 | * | 5/2005 | Kawaguchi ...................... 156/60 |
| 2005/0129955 | A1 | | 6/2005 | Schoenfeld et al. |
| 2005/0159511 | A1 | | 7/2005 | Kramer |

(Continued)

FOREIGN PATENT DOCUMENTS

CA 2 411 895 12/2001
CA 2510486 A1 7/2004

(Continued)

OTHER PUBLICATIONS

Evonik Industries, Aerosil RY 200 hydrophobic fumed silica, downloaded Aug. 24, 2013, one page.*
Derwent accession No. 1984-270165 for East German Patent No. 160,944 A, Kalal et al., Jul. 4, 1984, one page.*
HCAPLUS accession No. 1986:20445 for East German Patent No. 160,944 A3, Kalal et al., Jul. 4, 1984, two pages.*
Zeon Chemicals techical data sheet for Nipol 1072 butadiene-acrylonitrile copolymer, 2013, one page.*
Third Office Action Issued for Chinese Application No. 200880119108.5, Dated Dec. 23, 2013 (w/English Language Translation).
"The Next Kaneka", publication date unknown, www.Kaneka.com Feb. 11, 2008.
Ebenhoch; Tough and Heat-Resistant: New Silicone Particles for Thermosets: Kunststoffe Europe, Dec. 2004.

(Continued)

Primary Examiner — Robert Sellers
(74) Attorney, Agent, or Firm — Mary K. Cameron

(57) ABSTRACT

This invention relates to compositions useful as adhesives and more particularly to the preparation of heat-curable epoxy-based adhesive compositions that are resistant to being washed off substrate surfaces prior to being cured. The incorporation of a solid diene-based rubber, in particular an acrylonitrile-butadiene copolymer rubber having a relatively high Mooney viscosity, significantly enhances the wash-off resistance of the adhesive, while still allowing the adhesive to be readily dispensed by pumping under high shear conditions.

19 Claims, No Drawings

(56) References Cited

U.S. PATENT DOCUMENTS

| | | |
|---|---|---|
| 2005/0209401 A1 | 9/2005 | Lutz et al. |
| 2005/0215730 A1 | 9/2005 | Schoenfeld |
| 2006/0226525 A1* | 10/2006 | Osuga et al. ............. 257/685 |
| 2006/0276601 A1 | 12/2006 | Lutz et al. |
| 2007/0066721 A1 | 3/2007 | Kramer et al. |
| 2007/0104958 A1 | 5/2007 | Golden |
| 2007/0105983 A1 | 5/2007 | Kramer et al. |
| 2007/0251419 A1 | 11/2007 | Yamaguchi et al. |
| 2008/0029200 A1 | 2/2008 | Sheasley |
| 2008/0039585 A1* | 2/2008 | Nishioka et al. ............. 525/187 |
| 2008/0146470 A1* | 6/2008 | Logan et al. ................ 508/165 |
| 2009/0176903 A1* | 7/2009 | Muenz et al. ................ 521/91 |
| 2009/0294057 A1* | 12/2009 | Liang et al. ................. 156/330 |
| 2011/0036497 A1* | 2/2011 | Lammerschop et al. ..... 156/330 |

FOREIGN PATENT DOCUMENTS

| | | |
|---|---|---|
| CA | 2 532 215 | 1/2005 |
| CA | 2518618 | 1/2005 |
| CA | 2532215 A1 | 1/2005 |
| CA | 1330143 | 6/2005 |
| EP | 1 602 702 A1 | 7/2005 |
| EP | 1602702 A1 | 12/2005 |
| EP | 1632533 | 3/2006 |
| EP | 1728825 | 12/2006 |
| JP | 58-063758 | 4/1983 |
| JP | 58-069265 | 4/1983 |
| JP | 6-287411 A * | 10/1994 |
| JP | 06-287411 A | 10/1994 |
| JP | 09-025393 | 1/1997 |
| JP | 009-095599 A | 4/1997 |
| JP | 11-172076 A | 6/1999 |
| JP | 2001-019929 | 1/2001 |
| JP | 2001-19929 A * | 1/2001 |
| JP | 2003-020379 | 1/2003 |
| JP | 2003-277579 A | 10/2003 |
| JP | 2005-255822 | 9/2005 |
| KR | 2007-078135 A * | 7/2007 |
| WO | WO 96/17880 | 6/1996 |
| WO | 2006083677 A1 | 8/2006 |
| WO | 2006128722 A1 | 12/2006 |
| WO | 2007025007 A1 | 3/2007 |
| WO | WO 2007/025036 A1 | 3/2007 |
| WO | 2008045270 A1 | 4/2008 |

OTHER PUBLICATIONS

Kishi, et al; Shear Ductility and Toughenability Study of Highly Cross-Linked Epoxy/Polyethersulphone; Journal of Materals Science, vol. 32, No. 3 Feb. 1, 1997.(148489).

International Search Report Issued for Application No. PCT/US2006/033013; Dated Dec. 26, 2006.

Chinese Office Action Issued for Application No. 200880119108.5 Dated Aug. 13, 2014 (w/English language translation).

Canadian Examination Report Issued for Application No. 2,703,907 Dated Dec. 18, 2014.

International Search Report, International Application PCT/US2008/012264 mailed Jun. 1, 2009. All references cited in the International Search Report are listed above.

Written Opinion, International Application PCT/US2008/012264 mailed Jun. 1, 2009. All references cited in the Written Opinion are listed above.

Supplementary Europen Search Report dated Jun. 24, 2015, EP application No. EP 08 84 3498, 29 pages. All references cited in Supplementary European Search Report are listed herin, unless previously made of record.

Database CA [Online], Chemical Abstracts Service, Columbus, Ohio, US; Nov. 13, 2007, Lee, Sun Hong et al, "Structural adhesive sealer composition for metal bonding using recycled waste paint", XP002741310, retrieved from STN Database accession No. 2007:1287665, abstract. The relevance was cited in the Supplementary European Search Report filed herin.

Database CA [Online], Chemical Abstracts Service, Columbus, Ohio, US; Jan. 23, 2001, Kawaguchi, Yujiro et al, "One-liquid epoxy adhesive compositions for bonding iron core and case of impact-resistant ignition coils", XP002741311, retrieved from STN Database accession No. 2001:54356, abstract. The relevance was cited in the Supplementary European Search Report filed herein.

* cited by examiner

EPOXY-PASTE ADHESIVES RESISTANT TO WASH-OFF

CROSS-REFERENCE TO RELATED CASES

This application is a continuation under 35 U.S.C. Sections 365(c) and 120 of International Application No. PCT/US2008/012264, filed Oct. 29, 2008 and published on May 7, 2009 as WO 2009/058295, which claims priority from U.S. Provisional Patent Application Ser. No. 60/983,748 filed Oct. 30, 2007, which are incorporated herein by reference in their entirety.

FIELD OF THE INVENTION

This invention relates to compositions useful as adhesives and more particularly to the preparation of epoxy-based adhesive compositions having desirable rheological properties that render them capable of being readily applied to a substrate surface and yet resistant to being washed off such substrate surface prior to being cured.

BACKGROUND OF THE INVENTION

Epoxy resins have traditionally been extensively used as components of adhesives, especially structural adhesives, in view of their desirable combination of properties. Epoxy resin-based adhesives commonly exhibit excellent strength, toughness, corrosion, moisture and solvent resistance, high load-bearing properties, good adhesion and electrical properties, good dimensional stability, hardness and low shrinkage upon curing. Typically, epoxy resins may be formulated as one-component adhesives, together with other components such as fillers, tougheners, curatives and the like, which are applied in paste form between two substrate surfaces and then heated to effect curing (crosslinking) of the epoxy resin.

Good rheological control is important for such epoxy paste adhesives, as it will be desirable for the adhesive to thin under shear to allow for easy handling and application to a substrate surface. However, once it has been applied, the bead, ribbon or layer of adhesive must not slump, sag or flatten to an appreciable extent or be easily moved on or separated from the substrate surface by externally applied forces such as gravity or the impingement of liquids such may be encountered when the substrate surface bearing the adhesive is exposing to a washing or dipping operation (as typically occurs, for example, during assembly of a vehicle). Such movement or separation of the applied adhesive creates a number of problems, including degraded adhesive bond quality and contamination of the aqueous liquid (e.g., phosphating bath) with the adhesive. While a number of different types of rheological control agents have been proposed for use in epoxy paste adhesives in order to control their viscosity and yield value properties, further improvements in such systems are still highly desired by the end-users of these adhesives.

SUMMARY OF THE INVENTION

The present invention provides a wash-off resistant epoxy paste adhesive comprising at least one epoxy resin, at least one solid diene-based rubber, and at least one heat-activated latent curing agent.

DETAILED DESCRIPTION OF CERTAIN EMBODIMENTS OF THE INVENTION

Epoxy Resins

In general, a large number of polyepoxides having at least about two 1,2-epoxy groups per molecule are suitable as epoxy resins for the compositions of this invention. The epoxy resins may be saturated, unsaturated, cyclic or acyclic, aliphatic, alicyclic, aromatic or heterocyclic polyepoxide compounds. Examples of suitable epoxy resins include the polyglycidyl ethers, which are prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4-hydroxyphenyl)methane), bis(4-hydroxyphenyl)-1,1-isobutane, 4,4'-dihydroxybenzophenone, bis(4-hydroxyphenyl)-1,1-ethane, and 1,5-hydroxynaphthalene. Other suitable polyphenols as the basis for the polyglycidyl ethers are the known condensation products of phenol and formaldehyde or acetaldehyde of the novolak resin-type.

Other epoxy resins that are in principle suitable are the polyglycidyl ethers of polyalcohols or diamines. Such polyglycidyl ethers may be derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Other epoxy resins suitable for use are polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Additional suitable epoxy resins are derived from the epoxidation products of olefinically-unsaturated cycloaliphatic compounds or from natural oils and fats (e.g., epoxidized castor oil).

Particular preference is given to the liquid epoxy resins derived by reaction of bisphenol A or bisphenol F and epichlorohydrin. The epoxy resins that are liquid at room temperature generally have epoxy equivalent weights of from 150 to about 480.

The epoxy resins that are solid at room temperature may also or alternatively be used and are likewise obtainable from polyphenols and epichlorohydrin. Other polyepoxides that are in principle suitable are the polyglycidyl ethers of non-phenolic polyalcohols or diamines. Such polyglycidyl ethers may be derived from aliphatic polyalcohols, such as ethylene glycol, diethylene glycol, triethylene glycol, 1,2-propylene glycol, 1,4-butylene glycol, triethylene glycol, 1,5-pentanediol, 1,6-hexanediol, cyclohexane dimethanol or trimethylolpropane.

Other suitable epoxy resins are polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

Other epoxy resins are derived from the epoxidation products of olefinically-unsaturated cycloaliphatic compounds or from natural oils and fats (e.g., epoxidized castor oil).

Particular preference is given to the liquid epoxy resins derived by reaction of bisphenol A or bisphenol F and epichlorohydrin. The epoxy resins that are liquid at room temperature generally have preference is given to those based on bisphenol A or bisphenol F having a melting point of from 45 to 130° C., preferably from 50 to 80° C. They differ from the liquid epoxy resins substantially by the higher molecular weight thereof, as a result of which they become solid at room temperature. The solid epoxy resins generally have an epoxy equivalent weight of ≥400.

Typically, the composition may contain from about 20 to about 65 weight percent (in one embodiment, from about 25 to about 60 weight percent) of epoxy resin (unless otherwise stated, all concentrations set forth herein are expressed in terms of the weight percent of the component in question based on the adhesive composition as a whole). Mixtures of different epoxy resins may be advantageously employed, in particular mixtures of polyglycidyl ethers of polyphenols and polyglycidyl ethers of non-aromatic polyalcohols. In one desirable embodiment of the invention, the adhesive composition contains both at least one polyglycidyl ether of a polyphenol (e.g., diglycidyl ethers of bisphenol A, especially such epoxy resins that are liquid at 25° C.) and at least one polyglycidyl ether of an aliphatic polyalcohol (e.g., the diglycidyl ether of cyclohexane dimethanol). Such epoxy resins may be utilized in a weight ratio, for example, of from about 5:1 to about 25:1 (polyglycidylether of polyphenol:polyglycidyl ether of aliphatic polyalcohol). So-called "flexibilizing" epoxy resins may also be advantageously used in combination with polyglycidyl ethers of polyphenols.

Solid Diene-Based Rubbers

It has been discovered that the addition of relatively small amounts of one or more solid diene-based rubbers can render an epoxy paste adhesive remarkably resistant to being washed off a surface to which the uncured epoxy paste adhesive has been applied. At the same time, however, the epoxy paste adhesive may be formulated such that it is readily pumpable, especially under high shear conditions, which facilitates the application of the adhesive to a substrate surface.

The diene-based rubber should be solid at room temperature, i.e., within the range of 15 to 25 degrees C. The rubber may be a homopolymer of a conjugated diene such as butadiene, isoprene, pentadiene, hexadiene, 2,3-dimethyl-1,3-butadiene, or chloroprene, a copolymer of two or more different dienes, or a copolymer of one or more dienes together with one or more other unsaturated monomers such as (meth)acrylonitrile, vinyl aromatic monomers (e.g., styrene), olefins (e.g., ethylene, propylene, isobutane) and the like. The copolymers preferably have random structures, although the use of block copolymers is also contemplated. The diene-based rubber may have a linear, branched or crosslinked structure, but does not take the form of a core/shell particle where a central core is surrounded by an outer shell having a different composition than the core. Crosslinking may be achieved, for example, through the use of a polyfunctional comonomer such as divinyl benzene. Particularly suitable diene-based rubbers include, but are not limited to, styrene-butadiene copolymers (e.g., SBR) and acrylonitrile-butadiene copolymers (e.g., NBR). The latter type of diene-based rubber is especially preferred where a substrate which is to be adhered with the epoxy paste adhesive is an oily metal surface, since the use of acrylonitrile-butadiene copolymers leads to unexpected enhancement of the adhesive bond to such a surface when the adhesive is cured. Further, cured epoxy paste adhesives containing an acrylonitrile-butadiene copolymer rubber tend to exhibit improved failure mode when stressed as compared to adhesives containing styrene-butadiene copolymer rubbers. The acrylonitrile-butadiene copolymer rubber may, for example, contain from 25 to 35 weight % polymerized acrylonitrile. Other illustrative diene-based rubbers include polyisoprene, natural rubber, polybutadiene, polychloroprene, isoprene-isobutylene copolymers, isoprene-styrene copolymers, ethylene-propylene-diene monomer (EPDM) rubbers, and the like.

In certain embodiments of the invention, the rubber is non-functionalized; that is, the polymer or copolymer does not contain any functional groups such as active hydrogen groups (e.g., hydroxyl groups, amino groups, carboxylic acid groups) or epoxy groups.

Preferably, the Mooney viscosity (ML 1+4 at 100 degrees C.) of the diene-based rubber or mixture of diene-based rubbers used in the epoxy paste adhesive is at least 15 or at least 25 or at least 35 or at least 50. It is also preferred that the diene-based rubber or mixture of rubbers have a Mooney viscosity (ML 1+4 at 100 degrees C.) not greater than 150 or not greater than 125 or not greater than 100.

The diene-based rubber typically is supplied to the adhesive composition in finely divided, particulate form, but it is greatly preferred to prepare a preblend of the rubber (or mixture of rubbers) in epoxy resin prior to combining with the other components of the epoxy paste adhesive wherein the blend is subjected to extended, intimate mixing or milling so as to thoroughly disperse the rubber or rubbers within the epoxy resin matrix. If the epoxy paste adhesive is to contain a particulate inorganic filler such as calcium oxide, at least a portion of such filler may also be incorporated into the preblend. Such a filler may act as a grinding aid and assist in the dispersion of the rubber.

Thixotropic Agents/Rheology Control Agents

The epoxy paste adhesives of the present invention preferably may contain one or more types of thixotropic agents or rheology control agents, in addition to the solid diene-based rubber. In one embodiment of the invention, the adhesive contains at least one fumed silica, preferably at least one hydrophobic fumed silica. Fumed silica thixotropic agents are well-known in the art and are available from several commercial sources, including the fumed silica products sold under the CAB-O-SIL trademark by Cabot Corporation and the fumed silica products sold under the AEROSIL trademark by Degussa. Hydrophobic fumed silica is fumed silica that has been reacted with a compound (usually an organosilicon compound such as dimethyldichlorosilane, trimethoxyoctylsilane, polydimethylsiloxane or hexamethyldisilazane) to replace at least a portion of the hydroxyl groups on the surface of the fumed silica with other groups such as methyl groups. Specific fumed silicas useful in the present invention include, but are not limited to, CAB-O-SIL TS-720 and AEROSIL US202. In certain embodiments of the invention, the fumed silica has a BET surface area in the range of from about 80 to about 300 m$^2$/g and/or a carbon content of from about 0.5 to about 7 weight percent. Methods of preparing hydrophobic fumed silicas are well-known in the art and include, for example, the methods described in U.S. Pat. Nos. 2,739,075 and 2,786,042 (each of which is incorporated herein by reference in its entirety).

Impact Modifiers/Toughening Agents

The impact properties of cured epoxy paste adhesives in accordance with the present invention, at room temperature and/or lower temperatures, may often be improved by incorporating into such compositions one or more impact modifiers and/or toughening agents.

Suitable impact modifiers/toughening agents may be selected from a wide variety of substances, but generally speaking such materials are polymeric or oligomeric in character, have glass transition temperatures below 20° C. (more preferably below 0° C. or below −30° C. or below −50° C.), and may have functional groups such as epoxy groups, carboxylic acid groups, amino groups and/or hydroxyl groups capable of reacting with the other components of the compositions of the present invention when the composition is cured by heating (although alternatively the impact modifier/toughening agent may be free of such reactive functional groups).

The epoxy-based prepolymers (sometimes described herein as "adducts") obtained by reacting one or more amine-terminated polymers (particularly polymers having a Tg below 0 degrees C.) such as amine-terminated polyethers and amino silane-terminated polymers with one or more epoxy resins represent a particularly preferred class of impact modifiers/toughening agents. The epoxy resins useful for such purpose may be selected from among the epoxy resins described hereinabove, with particular preference being given to the diglycidyl ethers of polyphenols such as bisphenol A and bisphenol F (for example, having epoxy equivalent weights of from about 150 to about 1000). Mixtures of solid and liquid epoxy resins may be suitably employed.

The preparation of such epoxy-based prepolymers from amine-terminated polyethers is well known in the art and is described, for example, in U.S. Pat. Nos. 5,084,532 and 6,015,865, each of which is incorporated herein by reference in its entirety. Generally speaking, it will often be desirable to adjust the ratio of amine-terminated polyether:epoxy resin being reacted such that there is an excess of epoxy groups relative to amine groups such that the latter functional groups are completely reacted (i.e., the epoxy-based prepolymer contains essentially no free amine groups).

Mixtures of di- and trifunctional amine-terminated polyethers may be used. Amine-terminated polyethers containing both oxyethylene and oxypropylene repeating units may also be utilized as the amino-terminated polyether. Preferably, the amino-terminated polyether contains at least two amine groups per molecule. Preferably, the amine groups are primary amine groups. The amino-terminated polyether is preferably aliphatic.

When reacting the epoxy resins with the amine-terminated polyether, an excess of epoxy groups over the amino groups is preferably used so that the latter react completely with epoxide groups. Typically, there is a 1.5 to 10-fold excess, for example a 3.5-fold excess of epoxy groups over the active hydrogen equivalents (AHEW) of the amine-terminated polyether. In preparing the composition according to the present invention, the epoxy-based prepolymer component preferably is initially prepared in a first stage. To this end, preferably, the epoxy resins are reacted with the amine-terminated polyether c) in the desired ratio. The reaction preferably is carried out at high temperature, preferably at 90 to 130° C., for example at approximately 120° C., for a duration of, e.g., three hours.

In the preparation of the epoxy-based prepolymer, the following compounds may, for example, be used:

1. linear amine-terminated polyoxyethylene ethers having the formula:

$$H_2N-(CH_2)_2-[O-(CH_2)_2-O-(CH_2)_2]_n-NH_2$$

in which n preferably is 17 to 27.

2. linear amine-terminated polyoxypropylene ethers having the formula:

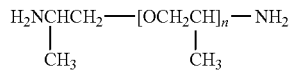

and isomers thereof in which n preferably is 5 to 100. They are obtainable from Huntsman Chemical under the trade name Jeffamine® (D-series). The number average molecular weight of such amine-terminated polyoxypropylene ethers may vary, for example, from about 300 to about 5000.

3. trifunctional compounds having the formula:

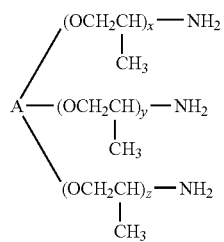

and isomers thereof in which A is

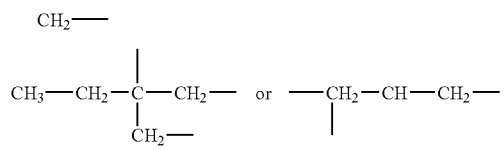

and x, y and z independently of each other are 1 to 40 and x+y+z is preferably >6. Representative examples of these trifunctional compounds are available commercially from Huntsman Chemical under the trade name Jeffamine® (T-series). Such substances typically have number average molecular weights of from about 300 to about 6000.

4. amino silane capped polymers, such as those that may be embraced by the general structure:

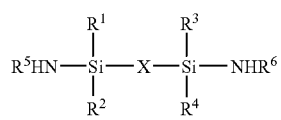

where $R^1$, $R^2$, $R^3$ and $R^4$ may be the same or different and are selected from hydrogen, hydroxyl, alkyl, alkoxy, alkenyl, alkenyloxy, aryl, and aryloxy; $R^5$ and $R^6$ may be the same or different and are selected from hydrogen, alkyl and aryl; and X is selected from alkylene, alkenylene, arylene, with or without interruption by a heteroatom; polyurethanes; polyethers; polyesters; polyacrylates; polyamides; polydienes; polysiloxanes; and polyimides.

For instance, amine-terminated siloxanes may be used, such as diamino siloxanes embraced by:

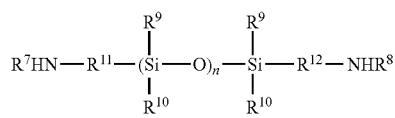

where $R^{11}$ and $R^{12}$ may be the same or different and are selected from alkylene, arylene, alkylene oxide, arylene oxide, alkylene esters, arylene esters, alkylene amides or arylene amides; $R^9$ and $R^{10}$ may be the same or different and are selected from alkyl or aryl; $R^7$ and $R^B$ are as defined above and n is 1-1,200.

Other tougheners or impact modifiers known in the epoxy adhesive art may be used in addition to, or as a substitute for, the aforementioned epoxy-based prepolymers derive by reaction of amine-terminated polyethers or amine-terminated polysiloxanes with epoxy resins. Generally speaking, such tougheners and impact modifiers are characterized by having glass transition temperatures below about 0° C., preferably below about −30° C., even more preferably below about −50° C. Examples of such tougheners and impact modifiers include, but are not limited to:

a. rubber particles having a core-shell structure, having a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.), such as those described, for example, in WO 2007/025007, incorporated herein by reference in its entirety;

b) reaction products of epoxy-reactive copolymers of butadiene (especially epoxy-reactive copolymers of butadiene with relatively polar comonomers such as (meth)acrylonitrile, (meth)acrylic acid, or alkyl acrylates, e.g., carboxyl-terminated butadiene-nitrile rubbers, such as the products available commercially from Noveon under the trade name HYCAR) with epoxy resins (as described, for example, in U.S. Patent Application Publication No. US 2003/0196753 and U.S. Pat. No. 6,776,869, each of which being incorporated herein by reference in its entirety);

c) adducts of anhydrides (e.g., unsaturated anhydrides such as maleic anhydride) and diene polymers (e.g., liquid 1,4-cis polybutadienes), typically having number average molecular weights between about 1000 and about 5000, including for example, the adducts sold under the tradename POLYVEST by Degussa Corporation, as well as further reaction products of such adducts with epoxy resins;

d) polyesters, including, for example, amorphous, crystalline and/or semi-crystalline polyesters, including saturated polyesters, prepared by condensation of aliphatic and/or aromatic dicarboxylic acids (or the corresponding alkyl esters or anhydrides with diols having a chain length of C2 to C20, the polyesters being of medium molecular weight (e.g., about 1000 to about 20,000 number average molecular weight), such as the polyesters Sold under the tradename DYNACOLL by Degussa Corporation, and including polyesters functionalized with carboxylic acid and/or hydroxyl endgroups, as well as adducts of such functionalized polyesters with epoxy resins;

e) adducts of dimeric fatty acids with epoxy resins (including, for example, the adducts sold under the tradename EPON 872 by Resolution Performance Products, the adducts sold under the tradename HyPox DA323 (formerly ERISYS EMDA 3-23) by CVC Specialty Chemicals, as well as those adducts described in U.S. Pat. No. 5,218,063, incorporated herein by reference in its entirety);

f) adducts of hydroxyl-containing triglycerides (e.g., castor oil) with epoxy resins (including, for example, the adducts sold under the tradename HELOXY 505 by Resolution Performance Products);

g) adducts of polysulfides with epoxy resins (including, for example, the adducts sold under the tradename THIOPLAST EPS 350 by Akzo Nobel);

adducts of amine-terminated polydienes and diene copolymers with epoxy resins;

h) block copolymers, wherein at least one polymeric block of the copolymer has a glass transition temperature below 20° C. (preferably below 0° C. or below −30° C. or below −50° C.) and at least one polymeric block of the copolymer has a glass transition temperature above 20° C. (preferably above 50° C. or above 70° C.), in particular block copolymers containing a polystyrene block, a 1,4-polybutadiene block (preferably having a glass transition temperature below about −60 degrees C.) and a polymethylmethacrylate block (preferably, having a highly, i.e., >80%, syndiotactic structure), such as the SBM copolymers made by living polymerization methods using nitroxide initiator (such as the methods described in U.S. Pat. Nos. 5,677,387, 5,686,534, and 5,886,112, each of which is incorporated herein by reference in its entirety) and sold under the tradename NANOSTRENGTH by Arkema and the block copolymers described in U.S. Pat. No. 6,894,113, incorporated herein by reference in its entirety;

i) polyurethanes (the term "polyurethanes" as used herein includes polyureas, polyurea-urethanes, as well as polyurethanes). Polyurethanes suitable for use in the adhesive compositions of the present invention include the reaction products of isocyanate-terminated prepolymers and compounds having one or more active hydrogen-containing groups (e.g., hydroxyl, thiol and amino groups such as primary aliphatic, cycloaliphatic, heteroaromatic and araliphatic amino, secondary aliphatic, cycloaliphatic, heteroaromatic and araliphatic amino, alkyl amido, phenolic, benzyl alcohol, aminophenyl or benzylamino groups or the like, such as those described in U.S. Pat. Nos. 3,525,779; 3,636,133; 5,278,257; and 6,776,869; published U.S. application 2005-070634, and WO 2006/128722, each of which is incorporated herein by reference in its entirety). Such polyurethanes may or may not contain isocyanate-reactive end groups (e.g., active hydrogen-containing end groups). Polyurethanes of this type are also available commercially from Huntsman Advanced Materials (formerly Vantico) under the tradename RAM. Useful polyurethanes also include the reaction products of isocyanate-terminated prepolymers and hydroxy-containing epoxide compounds (such as those described in Canadian Applications Nos. 2,510,486 and 2,532,215, each of which is incorporated herein by reference in its entirety);

j) carboxyl-functionalized adducts of amino- or hydroxyl-terminated polymers and carboxylic anhydrides, as well as further reaction products of such adducts with epoxy resins (such as those described in U.S. Pat. No. 6,884,854 and published U.S. application 2005-0215730, each of which is incorporated herein by reference in its entirety);

k) epoxy-terminated polyethers, such as polymers of alkylene oxides like ethylene oxide, propylene oxide or mixtures thereof that have been functionalized with epoxy groups, including by reacting the hydroxy groups of a polyalkylene glycol with epichlorohydrin; and l) phenol-terminated and aminophenyl-terminated products produced by reacting a stoichiometric excess of a carboxylic anhydride or dianhydride with a diamine or polyamine and then further reacting the excess carboxylic anhydride or carboxylic acid groups with at least one polyphenol or aminophenol, as described, for example, in published U.S. application 2004-0181013, incorporated herein by reference in its entirety.

Mixtures of different impact modifiers/toughening agents may be used. The amount of impact modifier/toughening agent in the curable compositions of the present invention may vary substantially but typically is from about 0.1 to about 40 weight percent, e.g., from about 5 to about 35 weight percent.

Typically, for example, the adhesive composition may contain from about 5 to about 40 weight percent (in one embodiment, from about 10 to about 35 weight percent) of epoxy-based prepolymer.

Curing Agents

Since the compositions of the present invention are preferably one-part or single-component compositions and are to be cured at elevated temperature after being stored for some period of time in unreacted form at ambient temperatures, they also contain one or more curing agents (hardeners) capable of accomplishing cross-linking or curing of certain of the adhesive components when the adhesive is heated to a temperature well in excess of room temperature. That is, the hardener is activated by heating. The hardener may function in a catalytic manner or, in preferred embodiments of the invention, participate directly in the curing process by reaction with one or more of the adhesive components.

There may be used as thermally-activatable or latent hardeners for the adhesive compositions of the present invention, for example, guanidines, substituted guanidines, substituted ureas, melamine resins, guanamine derivatives, cyclic tertiary amines, aromatic amines and/or mixtures thereof. The hardeners may be involved stoichiometrically in the hardening reaction; they may, however, also be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxymethylbenzoguanamine. For single-component, thermosetting adhesives, the selection criterion is, of course, the low solubility of those substances at room temperature in the resin system, so that solid, finely ground hardeners are preferred; dicyandiamide is especially suitable. Good storage stability of the composition is thereby ensured.

In addition to or instead of the above-mentioned hardeners, catalytically-active substituted ureas may be used. They are especially p-chlorophenyl-N,N-dimethylurea (monuron), 3-phenyl-1,1-dimethylurea (fenuron) or 3,4-dichlorophenyl-N,N-dimethylurea (diuron). In principle, catalytically active tertiary acryl- or alkyl-amines, such as benzyldimethylamine, tris(dimethylamino)phenol, piperidine or piperidine derivatives, may also be used, but they are in many cases too highly soluble in the adhesive system, so that usable storage stability of the single-component system is not achieved. Various imidazole derivatives, preferably solid imidazole derivatives, may also be used as catalytically-active accelerators. Examples which may be mentioned are 2-ethyl-2-methylimidazole, N-butylimidazole, benzimidazole and N—$C_1$ to $C_{12}$-alkylimidazoles or N-arylimidazoles. Particular preference is given to the use of a combination of hardener and accelerator in the form of so-called accelerated dicyandiamides in finely ground form. The separate addition of catalytically-active accelerators to the epoxy hardening system is thus not necessary.

The amount of curing agent utilized will depend upon a number of factors, including whether the curing agent acts as a catalyst or participates directly in crosslinking of the composition, the concentration of epoxy groups and other reactive groups in the composition, the desired curing rate and so forth. Typically, the composition contains from about 0.5 to about 10 weight percent curing agent(s).

Other Additives

The inventive compositions may also contain known fillers such as the various ground or precipitated chalks, quartz powder, alumina, dolomite, clays other than nanoclay thixotropic agents, mica, talc, calcium carbonate, carbon fibers, metal powders, glass fibers, polymeric fibers, titanium dioxide, fused silica, carbon black, calcium oxide, calcium magnesium carbonates, barite and, especially, silicate-like fillers of the aluminum magnesium calcium silicate type, for example wollastonite and chlorite. Certain of such fillers may also function as thixotropic or rheology control agents. The filler may take the form of finely divided particles, fibers, platelets, or the like. Typically, the compositions of the present invention may contain from about 0.5 to about 35 weight percent of fillers.

In one embodiment of the invention, the composition additionally contains one or more expanding agents (sometimes referred to in the art as blowing agents). The expandable properties of the resulting adhesive are particularly useful in applications where the complete filling of a gap or cavity in a part or member is critical in order to maintain maximum structural integrity of the part or member. If the composition is to be utilized as a one-part or single-component composition, the expanding agent is preferably a latent expanding agent that causes expansion or foaming of the adhesive only when heated to a temperature significantly above room temperature (typically, a temperature which is in the range at which curing of the adhesive is also initiated). Any suitable expanding agent may be employed, such as a chemical expanding agent, e.g., azo compounds, nitroso compounds, carbazides, hydrazides and the like, as well as expandable microspheres. Expandable microspheres generally comprise small diameter polymeric shells or bubbles which encapsulate one or more volatile substances such as light hydrocarbons or halocarbons. The outer shells are usually thermoplastic in character to permit softening and expansion of the microspheres when heated due to volatilization of the substances trapped within the shells. The polymers used in the shells may be linear, branched, or cross-linked and may be comprised of, for example, acrylic resins, styrenic resins, poiyvinylidene chloride, nitrile polymers, and the like. Typically, the average particle size of the expandable microspheres is in the range of from about 5 to about 100 microns. Suitable expandable microspheres are commercially available under the trademark name DUALITE from Henkel Corporation (formerly, Pierce & Stevens). Typically, up to about 10 weight % (e.g., 0.1 to 2 weight %) blowing agent can be present, although it is not required for the epoxy paste adhesives of the present invention to contain any blowing agent. In one embodiment, an amount of blowing agent is present which is effective to cause the epoxy paste adhesive to expand in volume from 10 to 100% or from 40 to 60% when the adhesive is heated at the selected curing temperature, although epoxy paste adhesives having even greater expansion rates are also contemplated by the present invention.

In yet another embodiment, hollow glass microspheres are present in the composition. Commercially available hollow glass microspheres include the materials sold by Minnesota Mining & Manufacturing under the trademark SCOTCHLITE, with suitable grades including those available under the designations B38, C15, K20 and VS 5500. The glass microspheres preferably have diameters in the range of from about 5 to 200 micrometers and/or densities of from about 0.3 to about 0.5 g/cc. Typically, the composition may contain up to about 10 weight percent (e.g., from about 0.5 to about 5 weight percent) of hollow glass microspheres; in other embodiments, however, the epoxy paste adhesive of the present invention is free of hollow glass microspheres.

The adhesive compositions according to the present invention may also contain other common adjuvants and additives, such as plasticizers, reactive and/or non-reactive diluents (e.g., mono-epoxides), flow auxiliaries, coupling agents (e.g., silanes), adhesion promoters (e.g., chelating epoxy resins), wetting agents, anti-stringing agents (e.g., mixtures of amorphous silica and fibrillated polyethylene fibers, such as the product sold under the tradename SYLOTHIX 53 by W. R. Grace), tackifiers, flame retardants, biocides, ageing and/or corrosion inhibitors, stabilizers and/or coloring pigments. Depending on the requirements of the adhesive application with respect to the adhesive's processing properties, its flexibility, the required rigidifying action and the adhesive bond to the substrate, the relative proportions of the individual components may vary within comparatively wide limits.

In one embodiment, the composition includes a reactive diluent such as a mono-epoxide (e.g., monoglycidyl ethers of alkyl- and alkenyl-substituted phenols or long chain aliphatic alcohols, such as C8 to C20 straight chain saturated aliphatic alcohols). Typically, the composition may contain up to about 25 weight percent (e.g., from about 5 to about 18 weight percent) reactive diluent. In general, one or more reactive diluents may be used in an amount effective to lower the viscosity of the epoxy paste adhesive to the desired level.

Epoxy paste adhesive compositions in accordance with the present invention include compositions corresponding to the following formulations (the weight percentages being based on the total weight of the adhesive composition, it being understood that other components other than those mentioned below may also be present, such as coupling agents, pigments, curative accelerators, flame retardants, and the like):

| | |
|---|---|
| Polyglycidyl ethers of polyphenols | 20-50 weight % |
| Other epoxy resins | 0.5-10 weight % |
| Solid diene-based rubber(s) | 1-8 weight % |
| Impact modifier/toughening agent(s) | 5-30 weight % |
| Filler(s) and/or thixotropic/rheology control agent(s) | 10-35 weight % |
| Heat-activated latent curing agent(s) | 1-10 weight % |
| Heat-activated latent blowing agent(s) | 0-2 weight % |

The epoxy paste adhesive may be formulated to provide a yield value of at least 1000 Pa and/or not greater than 4000 Pa, e.g., within the range of 2000 to 3000 Pa (measured using rheometer testing performed by running a thixoloop from 0-80 $s^{-1}$, 40 mm plate at 35 degrees C., with the yield value being determined by running a Bingham analysis on the forward stress curve).

Methods of Use

The inventive composition is suitable for adhering together parts made of different materials, including, for example, wood, metal, coated or pretreated metal, plastic, filled plastic, thermoset materials such as sheet molding compound and the like. The substrates to be joined using the adhesive may be the same as or different from each other. It is preferably used for the gluing of metal parts and particularly for the gluing of steel sheets such as cold rolled steel sheets, electro-galvanized steel sheets, hot-dip galvanized steel sheets, galvannealed steel sheets and/or zinc/nickel-coated steel sheets, for example. The composition is especially useful for bonding substrates that, subsequent to the application of the adhesive but prior to heating and curing of the adhesive, will be contacted with liquid in the form of an aqueous bath or stream.

The inventive composition can be applied to a substrate surface by any technique known in the art. For example, it can be applied by extrusion from a robot in bead form onto the substrate or by mechanical application methods such as a caulking gun or extruder, or any other manual application means, and can also be applied using a swirl or streaming technique. The swirl and streaming techniques utilize equipment well known in the art such as pumps, control systems, dosing gun assemblies, remote dosing devices and application guns. Generally, the adhesive is applied to one or both of the substrates to be joined. The substrates are contacted such that the adhesive is located between the substrates to be bonded together. Thereafter, the adhesive composition is subjected to heating to a temperature at which the heat curable or latent curing agent initiates cure of the epoxy paste adhesive.

The epoxy paste adhesive of this invention is preferably formulated to be capable of being flowed or pumped to the work site at ambient temperatures or slightly above ambient temperatures (e.g., from about 15 to about 45 degrees C.) since, in most applications, it is preferable to ensure that the adhesive is heated only up to a temperature at which the latent curing agent is not yet activated. To reduce the viscosity of the adhesive composition to a workable level (i.e., to render it capable of flowing as a liquid) it may be desirable to subject it to high shearing forces using suitable equipment. The composition may be applied directly to the substrate surface or may be allowed to flow into a space separating the substrates to be joined, such as in a hem flanging operation. An advantage of the present invention is that the adhesive need not be subjected to a precuring or gelling step wherein the adhesive, after being applied to the substrate surface, is heated to an intermediate temperature (i.e., above room temperature but below the final cure temperature) for a time effective to cause the adhesive to gel or cure to an extent effective to render the adhesive resistant to wash-off. That is, the epoxy paste adhesive of the present invention in preferred embodiments inherently has a yield value sufficiently high that a precuring or gelling step is not necessary, thereby simplifying the assembly processes in which such adhesive is used. However, if it is desired to further increase the wash off resistance of the adhesive compositions, such a tempering step could be practiced (e.g., the adhesive composition could be heated to a temperature of from about 50 degrees C. to about 100 degrees C. for a time effective to increase the yield value to the desired level).

The epoxy paste adhesive is preferably cured in an oven at a temperature which lies clearly above the temperature at which the composition was applied to the parts to be bonded and at or above the temperature at which the curing agent and/or accelerator and/or latent expanding agent (if present) are activated (i.e., in the case of the hardener, the minimum temperature at which the curing agent becomes reactive towards the other components of the adhesive; in the case of the expanding agent, the minimum temperature at which the expanding agent causes foaming or expansion of the adhesive). Curing preferably takes place at a temperature above 150° C., for example at 160 to 190° C., for about 10 to about 60 minutes.

One particularly preferred application for the adhesives according to the present invention is the formation of structural bonds in vehicle construction such as in hem flanges (e.g., bodyshell construction). The adhesive compositions according to the present invention may also be used as casting resins in the electrical or electronics industry or as die attach adhesives in electronics for bonding components to printed circuit boards. Further possible applications for the compositions are as matrix materials for composites, such as fiber-reinforced composites.

In the embodiment of the invention where the composition includes one or more expanding (blowing) agents, the adhesive may be utilized to form structural foams which serve to stiffen and reinforce cavities, gaps, structural members and the like. The composition may be supported or contained within a carrier or receptacle or the like so as to position or orient the adhesive such that it expands in one or more particular directions when heated to induce curing and foaming. The composition thus is particularly useful in filling irregularly shaped spaces, as the composition will expand so as to come into contact with a greater portion of the substrate surfaces in the vicinity of the composition than would occur if no expanding agent was present. The foamed, cured composition may be used to stiffen and/or increase the energy absorption capacity of vehicle cavities and structural members.

Example 1

A preblended rubber base is prepared by intimately mixing 27.0 parts by weight NITRIFLEX N-8 acrylonitrile-butadiene copolymer rubber (NBR), 0.4 parts by weight NIPOL 1411 acrylonitrile-butadiene copolymer rubber (ca. 38 wt. % acrylonitrile; Zeon Chemicals), 35.1 parts by weight HUBERCARB Q325 calcium carbonate, and 37.6 parts by weight EPON 828 epoxy resin.

An epoxy paste adhesive in accordance with the present invention is prepared by combining the preblended rubber base with the following components, the amounts of which are expressed in weight percent.

| Component | Amount (wt %) |
|---|---|
| Epoxy Resin A[1] | 31.0 |
| Epoxy Resin B[2] | 2.0 |
| Epoxy Resin C[3] | 2.0 |
| Silane[4] | 0.1 |
| Toughening Agent[5] | 24.0 |
| Preblended Rubber Base | 10.0 |
| Additive[6] | 0.5 |
| Flame Retardant[7] | 0.5 |
| Calcium Oxide | 1.0 |
| Dicyandiamide[8] | 6.0 |
| Rheology Modifier[9] | 15.0 |
| Calcium Carbonate[10] | 4.0 |
| Blowing Agent[11] | 0.3 |
| Fumed Silica[12] | 2.5 |
| Anti-Stringing Agent[13] | 0.6 |
| Carbon Black[14] | 0.2 |
| Accelerator[15] | 0.3 |

[1]EPON 828 diglycidyl ether of bisphenol A (185-192 epoxide equivalent weight; Dow)
[2]HELOXY 107 diglycidyl ether of cyclohexanedimethanol (Hexion Specialty Chemicals)
[3]HELOXY 505 epoxidized castor oil (Hexion Specialty Chemicals)
[4]SILQUEST A187J gamma-glycidoxypropyltrimethoxysilane (GE Advanced Materials)
[5]epoxy resin/amine-terminated polyether reaction product, prepared in accordance with U.S. Pat. No. 6,015,865
[6]BUSAN 11M1
[7]BA59P (Great Lakes Chemical)
[8]AMICURE CG1200 (Air Products)
[9]CALBATEC VISCOLITE OS calcium carbonate (Shirashi Kogyo Kaisha, Ltd.)
[10]HUBERCARB Q325 (J. M. Huber)
[11]POROFOR ADC/MC1 azodicarbonamide (Lanxess)
[12]CAB-O-SIL TS720 (Cabot)
[13]SYLOTHIX 53 (W. R. Grace)
[14]MONARCH 280 (Cabot)
[15]DYHARD UR300 urea (Degussa)

The aforedescribed epoxy paste adhesive in accordance with the invention has a relatively low viscosity at room temperature and thus can be readily dispensed by pumping through a nozzle or the like onto a metal surface, yet has a relatively high yield value (even at a moderately elevated temperature, e.g., 50 to 70 degrees C.) and is therefore significantly more resistant to slumping or sagging or to being washed off the metal surface by an impinging liquid than an analogous composition that does not contain a solid diene-based rubber.

Example 2

A preblended rubber base is prepared by intimately mixing 21.8 parts by weight CHEMIGUM P7747 acrylonitrile-butadiene copolymer rubber (NBR; Eliokem), 0.3 parts by weight NIPOL 1411 acrylonitrile-butadiene copolymer rubber (ca. 38 wt. % acrylonitrile; Zeon Chemicals), 29.1 parts by weight HUBERCARB Q325 calcium carbonate, and 48.8 parts by weight EPON 828 epoxy resin.

An epoxy paste adhesive in accordance with the present invention is prepared by combining the preblended rubber base with the following components, the amounts of which are expressed in weight percent.

| Component | Amount (wt %) |
|---|---|
| Epoxy Resin A[1] | 30.6 |
| Epoxy Resin B[2] | 2.0 |
| Epoxy Resin C[3] | 2.0 |
| Silane[4] | 0.1 |
| Toughening Agent[5] | 24.0 |
| Preblended Rubber Base | 10.0 |
| Additive[6] | 0.5 |
| Flame Retardant[7] | 0.5 |
| Calcium Oxide | 1.0 |
| Dicyandiamide[8] | 6.0 |
| Rheology Modifier[9] | 15.0 |
| Calcium Carbonate[10] | 4.0 |
| Blowing Agent[11] | 0.3 |
| Fumed Silica | 2.5 |
| Anti-Stringing Agent[13] | 1.0 |
| Carbon Black[14] | 0.2 |
| Accelerator[15] | 0.3 |

[1]EPON 828 diglycidyl ether of bisphenol A (185-192 epoxide equivalent weight; Dow)
[2]HELOXY 107 diglycidyl ether of cyclohexanedimethanol (Hexion Specialty Chemicals)
[3]HELOXY 505 epoxidized castor oil (Hexion Specialty Chemicals)
[4]SILQUEST A187J gamma-glycidoxypropyltrimethoxysilane (GE Advanced Materials)
[5]epoxy resin/amine-terminated polyether reaction product, prepared in accordance with U.S. Pat. No. 6,015,865
[6]BUSAN 11M1
[7]BA59P (Great Lakes Chemical)
[8]AMICURE CG1200 (Air Products)
[9]CALBATEC VISCOLITE OS calcium carbonate (Shirashi Kogyo Kaisha, Ltd.)
[10]HUBERCARB Q325 (J. M. Huber)
[11]CELLCOM AC7000F/7001
[12]CAB-O-SIL TS720 (Cabot)
[13]SYLOTHIX 53 (W. R. Grace)
[14]MONARCH 280 (Cabot)
[15]DYHARD UR300 urea (Degussa)

The epoxy paste adhesive thereby obtained exhibits a avorable combination of properties, similar to those possessed by the epoxy paste adhesive of Example 1.

What is claimed is:

1. A pumpable and wash-off resistant epoxy paste adhesive comprising: A) at least one epoxy resin; B) from 1 to 8 weight %, based on the total weight of the epoxy paste adhesive, of at least one solid diene-based rubber, wherein the solid diene-based rubber does not take the form of a core/shell particle where a central core is surrounded by an outer shell having a different composition than the core and wherein the solid diene-based rubber is comprised of from 25 to 35 weight percent acrylonitrile and 65 to 75 weight percent butadiene; C) at least one heat-activated latent curing agent; and D) at least one impact modifier/toughening agent selected from the group consisting of epoxy-based prepolymers obtained by reacting one or more amine-terminated polymers with one or more epoxy resins.

2. The epoxy paste adhesive of claim 1 wherein said at least one solid diene-based rubber has a Mooney viscosity of from 50 to 100 at 100 degrees C. as measured by ASTM D-1646 (Method B-002).

3. The epoxy paste adhesive of claim 1 wherein said at least one solid diene-based rubber is crosslinked.

4. The epoxy paste adhesive of claim 1 additionally comprising one or more of: at least one thixotropic agent/rheology modifier; at least one heat-activated blowing agent; at least one impact modifier/toughening agent other than the at least one impact modifier/toughening agent selected from the group consisting of epoxy-based prepolymers obtained by reacting one or more amine-terminated polymers with one or more epoxy resins; or at least one inorganic filler.

5. The epoxy paste adhesive of claim 1 comprising at least one substituted guanidine heat-activated latent curing agent.

6. The epoxy paste adhesive of claim 1 additionally comprising at least one inorganic particulate additive selected from the group consisting of calcium oxide and calcium carbonate.

7. The epoxy paste adhesive of claim 1 wherein the at least one epoxy resin includes at least one polyglycidyl ether of a polyphenol and at least one polyglycidyl ether of a non-aromatic polyalcohol.

8. The epoxy paste adhesive of claim 1 comprising from about 30 to about 65 weight percent of epoxy resin.

9. The epoxy paste adhesive of claim 1 comprising from about 25 to about 60 weight percent epoxy resin and about 0.5 to about 10 weight percent heat-activated latent curing agent.

10. The epoxy paste adhesive of claim 1, wherein said at least one solid diene-based rubber is crosslinked.

11. The epoxy paste adhesive of claim 1, additionally comprising at least one anti-stringing agent.

12. The epoxy paste adhesive of claim 11, wherein the at least one anti-stringing agent is a mixture of amorphous silica and fibrillated polyethylene fibers.

13. The epoxy paste adhesive of claim 1, wherein the at least one epoxy resin includes at least one epoxy resin selected from the group consisting of diglycidyl ethers of bisphenol A and bisphenol F.

14. The epoxy paste adhesive of claim 1, wherein the at least one solid diene-based rubber includes at least one solid diene-based rubber having a Mooney viscosity of at least 25 and not more than 100 at 100 degrees C. as measured by ASTM D-1646 (Method B-002).

15. A method of making the epoxy paste adhesive of claim 1, comprising preparing a preblend of the at least one solid diene-based rubber and epoxy resin and combining the preblend with other components of the epoxy paste adhesive.

16. The method of claim 15, wherein the preblend additionally includes a particulate inorganic filler.

17. A method of increasing wash-off resistance of an epoxy paste adhesive comprised of at least one epoxy resin, and at least one impact modifier/toughening agent selected from the group consisting of epoxy-based prepolymers obtained by reacting one or more amine-terminated polymers with one or more epoxy resins, and at least one heat-activated latent curing agent, said method comprising incorporating into said epoxy paste adhesive from 1 to 8 weight percent, based on the total weight of the epoxy paste adhesive, of one or more solid diene-based rubbers, wherein the solid diene-based rubbers do not take the form of a core/shell particle where a central core is surrounded by an outer shell having a different composition than the core and wherein the solid diene-based rubber is comprised of from 25 to 35 weight percent acrylonitrile and 65 to 75 weight percent butadiene.

18. The method of claim 17, wherein the at least one anti-stringing agent is a mixture of amorphous silica and fibrillated polyethylene fibers.

19. The method of claim 17, wherein said at least one solid diene-based rubber has a Mooney viscosity of from 50 to 100 at 100 degrees C. as measured by ASTM D-1646 (Method B-002).

* * * * *